(12) United States Patent
Shani et al.

(10) Patent No.: US 12,289,638 B2
(45) Date of Patent: *Apr. 29, 2025

(54) AVOIDING MEDIA ACCESS CONTROL PADDING OF TRIGGER-BASED PHYSICAL LAYER CONVERGENCE PROTOCOL DATA UNIT

(71) Applicant: Texas Instruments Incorporated, Dallas, TX (US)

(72) Inventors: Oren Aharon Shani, Kfar-Saba (IL); Shai Erez, Tsofit (IL); Matan Ben-Shachar, Kibbutz Givat Haim Ihud (IL)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/327,338

(22) Filed: Jun. 1, 2023

(65) Prior Publication Data
US 2023/0308945 A1    Sep. 28, 2023

Related U.S. Application Data

(63) Continuation of application No. 17/462,061, filed on Aug. 31, 2021, now Pat. No. 11,706,663, which is a
(Continued)

(51) Int. Cl.
*H04W 84/12* (2009.01)
*H04L 1/1607* (2023.01)
(Continued)

(52) U.S. Cl.
CPC .......... *H04W 28/06* (2013.01); *H04L 1/1607* (2013.01); *H04W 52/0209* (2013.01); *H04W 80/02* (2013.01); *H04W 84/12* (2013.01)

(58) Field of Classification Search
CPC .......................... H04W 52/0209; H04W 28/06
See application file for complete search history.

(56) References Cited

U.S. PATENT DOCUMENTS

| 2017/0079071 A1 | 3/2017 | Zhou |
| 2017/0289926 A1 | 10/2017 | Sutskover |

(Continued)

FOREIGN PATENT DOCUMENTS

| CN | 107925514 B | 3/2021 |
| EP | 3562203 A1 | 10/2019 |

*Primary Examiner* — Lan-Huong Truong
(74) *Attorney, Agent, or Firm* — Michelle F. Murray; Frank D. Cimino

(57) ABSTRACT

A wireless station (STA) in a wireless local area network (WLAN) performs a method to avoid media access control (MAC) padding of a physical layer convergence protocol data unit (PPDU) (e.g., a trigger-based (TB) PPDU, etc.). The method can reduce current or power consumption by the STA, which can in turn optimize the STA and, in certain instances, the WLAN as whole. In one example, the method includes the STA receiving a trigger frame from an access point (AP). The trigger frame specifies a length of a PPDU. The method further includes the STA generating a TB PPDU based on the specifications in the trigger frame. In particular, the STA generates a PPDU that has a length that is less than the length specified by the trigger frame. The method also includes the STA transmitting the generated PPDU to the AP.

25 Claims, 6 Drawing Sheets

Related U.S. Application Data continuation of application No. 16/814,327, filed on Mar. 10, 2020, now Pat. No. 11,140,576.

(60) Provisional application No. 62/955,694, filed on Dec. 31, 2019.

(51) Int. Cl.
*H04W 28/06* (2009.01)
*H04W 52/02* (2009.01)
*H04W 80/02* (2009.01)

(56) References Cited

U.S. PATENT DOCUMENTS

| | | | |
|---|---|---|---|
| 2018/0014327 A1 | 1/2018 | Park | |
| 2018/0146426 A1 | 5/2018 | Park | |
| 2018/0176901 A1 | 6/2018 | Huang | |
| 2018/0317242 A1 | 11/2018 | Park | |
| 2019/0045461 A1 | 2/2019 | Fang | |
| 2019/0097857 A1 | 3/2019 | Zhang | |
| 2019/0124526 A1* | 4/2019 | Park | H04L 1/1685 |
| 2019/0149640 A1 | 5/2019 | Chen | |
| 2019/0268099 A1 | 8/2019 | Chu | |
| 2019/0313466 A1 | 10/2019 | Ko | |
| 2019/0319738 A1 | 10/2019 | Ahn | |
| 2020/0014509 A1 | 1/2020 | Asterjadhi | |
| 2020/0221385 A1* | 7/2020 | Asterjadhi | H04W 74/06 |
| 2020/0404683 A1 | 12/2020 | Houghton | |

* cited by examiner

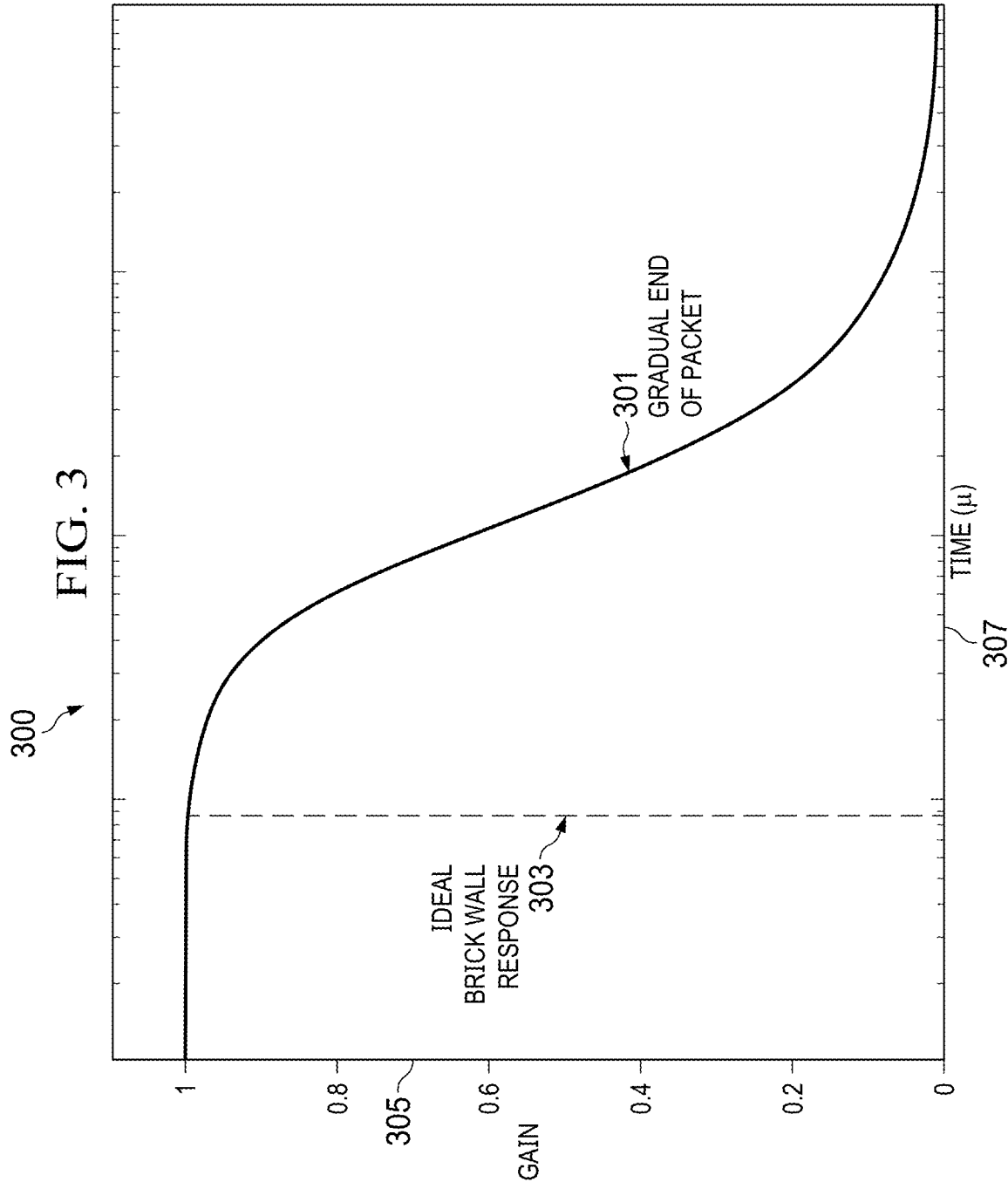

AVOIDING MEDIA ACCESS CONTROL PADDING OF TRIGGER-BASED PHYSICAL LAYER CONVERGENCE PROTOCOL DATA UNIT

CROSS-REFERENCE TO RELATED APPLICATION

This application is a continuation of U.S. patent application Ser. No. 17/462,061, filed Aug. 31, 2021, which is a continuation of U.S. patent application Ser. No. 16/814,327, filed Mar. 10, 2020, now U.S. Pat. No. 11,140,576, which claims priority to U.S. Provisional Application No. 62/955,694, filed Dec. 31, 2019, which applications are hereby incorporated by reference.

BACKGROUND

In the Institute of Electrical and Electronics Engineers (IEEE) 802.1 lax protocol, an access point (AP) can communicate, with multiple stations (STAs) simultaneously. In one scenario, the AP transmits a trigger frame to the STAs to discover data that the STAs wish to send to the AP. Each of the STAs responds to the AP's trigger frame with a physical layer convergence protocol data unit (PPDU) that contains the requested information.

When generating a PPDU, an STA may need to pad the PPDU in order to satisfy the length of the PPDU defined in the trigger frame. A large portion of the padding is done on the media access control (MAC) layer by adding dummy frames to reach the defined length. PPDU length equalization is used to avoid or minimize potential transient events that may occur when an STA stops transmitting its PPDU in the middle of an uplink (UL) transmission. These transient effects can decrease the PPDU's error vector magnitude (EVM). In addition, transmission of the padding in a PPDU may require more resources than transmission of the data in the PPDU. For example, the current or time associated with transmitting the padding in the PPDU may be undesirably larger than the current or time associated with transmitting data in the PPDU. Furthermore, current or power consumption in the case of UL transmission, which is subject to the AP's grouping policy, may be affected by unpredictability and instability.

SUMMARY

A wireless station (STA) in a wireless local area network (WLAN) performs a method to avoid media access control (MAC) padding of Institute of Electrical and Electronics Engineers (IEEE) 802.11ax trigger-based (TB) physical layer convergence protocol data unit (PPDU). The method can reduce current consumption by the STA, which can in turn optimize the STA and, in certain instances, the WLAN as whole. In one example, the method includes the STA receiving a trigger frame from an access point (AP). The trigger frame specifies a length of a TB PPDU. The method further includes the STA generating an TB PPDU based on the specifications in the trigger frame. In particular, the STA generates an TB PPDU that has a length that is less than the length specified by the trigger frame. The method also includes the STA transmitting the generated TB PPDU to the AP.

In another example, the method described above in the preceding paragraph may be implemented using one or more non-transitory computer readable mediums. Additionally, the method described above in the preceding paragraph may be implemented by an apparatus having means to perform the operations of the method.

BRIEF DESCRIPTION OF THE DRAWINGS

For a detailed description of various examples, reference will now be made to the accompanying drawings in which:

FIG. 3 is an illustration of an example graph highlighting a gradual drop in gain over time that is attributable to a gradual shutdown of an exemplary wireless station (STA).

DETAILED DESCRIPTION

The examples described herein pertain to one or more devices (e.g., wireless stations (STAs), access points (APs), etc.) configured to operate in a network (e.g., a wireless local area network (WLAN), etc.) that is designed in accordance with a wireless protocol (e.g., the Institute of Electrical and Electronics Engineers (IEEE) 802.11ax protocol, any other IEEE 802.11 protocol, any other suitable wireless protocol, any combination thereof, etc.). In one scenario, the example STAs generate a trigger-based (TB) physical layer convergence protocol data unit (PPDU) in response to receiving a trigger frame from an AP. In this scenario, the generated TB PPDU has a length that is shorter than the length specified by the trigger frame. The generated TB PPDU's shorter length is attributable to the generated TB PPDU comprising little or no padding. Consequently, the amount of current or power associated with transmitting the generated TB PPDU can be reduced. More specifically, the current or power associated with transmitting the generated TB PPDU is less than the current or power associated with transmitting an TB PPDU having the length specified by the trigger frame. The current or power savings that are attributable to the generated TB PPDU can improve the operation of the STA and, in some scenarios, the network itself.

Figure 1:
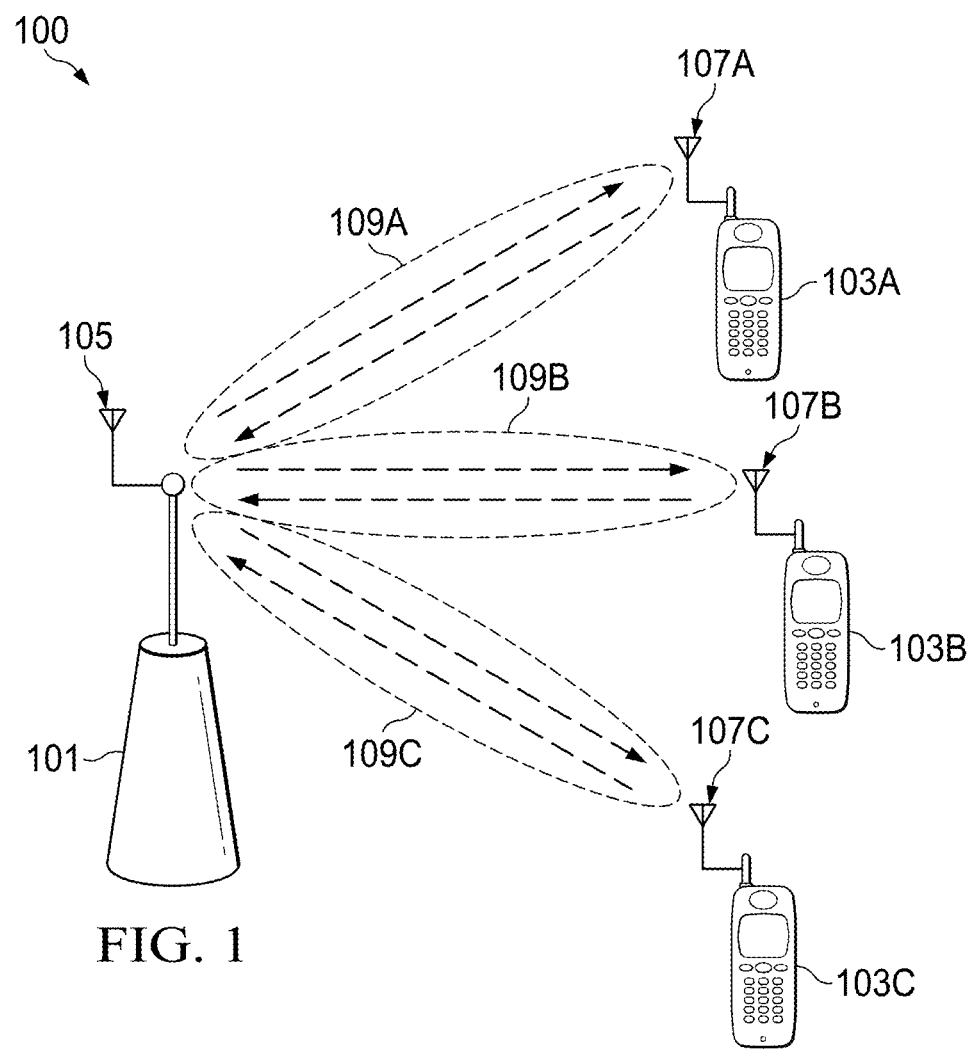
FIG. 1 is an illustration of an example architecture of a system of a network.

FIG. 1 is an illustration of an example architecture of a system 100 of a network (e.g., a local area network (LAN), a wireless LAN (WLAN), etc.). The following description is provided for an example system 100 that operates in conjunction with a wireless protocol (e.g., the IEEE 802.11ax protocol, any other IEEE 802.11 protocol, any other suitable wireless protocol, any combination thereof, etc.). Notably, the example system 100 is not limited to the IEEE 802.11ax protocol and may apply to other protocols or combinations or protocols that benefit from the principles described herein, such as current and future IEEE 802.11 protocols.

As shown in FIG. 1, the system 100 includes an AP 101 coupled to an antenna array 105. The antenna array 105 shown in FIG. 1 comprises one antenna; however, the antenna array 105 may include multiple antennae. In one example, the antenna array 105 is coupled to one or more receivers (not shown) of the AP 101 that are capable of receiving any number of signals. The antenna array 105, in one example, is coupled to one or more transmitters of the AP 101 (not shown) that are capable of transmitting any number of signals. An example antenna array 105 may be communicatively coupled to one or more transceivers (not shown) of the AP 101 that can receive or transmit any number of signals.

The AP 101 is sometimes referred to as a wireless AP (WAP). The AP 101 may be a hardware device or node on a LAN or a WLAN that allows devices (e.g., STAs 103A-103C, etc.) to connect to each other, the Internet, or another network using a wireless standard (e.g., any one of the IEEE 802.11 protocols, Bluetooth, etc.).

The system 100 also includes STAs 103A-103C, which can, among others, receive frames or packets from the AP 101 and transmit frames or packets to the AP 101. As shown in FIG. 1, each of the STAs 103A-103C includes a corresponding antenna array 107A-107C. Each of the antenna arrays 107A-107C may include one or more antennae. Each antennae array 107A-107C may be communicatively coupled to one or more receivers (not shown) of a corresponding one of STAs 103A-103C that can receive signals. In one example, each antennae 107A-107C may be communicatively coupled to one or more transmitters (not shown) of a corresponding one of STAs 103A-103C that can transmit signals. Each antennae 107A-107C, in one example, is communicatively coupled to one or more transceivers (not shown) of a corresponding one of STAs 103A-103C that can receive or transmit signals. In one embodiment, each of the STAs 103A-103C is a device that has the capability to use one or more of the IEEE 802.11 protocols (e.g., IEEE 802.11ax protocol, etc.). An STA (e.g., any one of STAs 103A-103C, etc.) may, for example, be a laptop, a desktop personal computer (PC), personal digital assistant (PDA), Wi-Fi phone, a vehicle, a wearable, a tablet, or any other type of computing device that can be operated by an end user. An STA (e.g., any one of STAs 103A-103C, etc.) may be fixed, mobile, or portable. At least one of STAs 103A-103C is a device that contains an IEEE 802.11-conformant media access control (MAC) and a physical layer (PHY) interface to a wireless medium (WM).

As shown in FIG. 1, the AP 101 can communicate 109A through wireless or wired coupling mechanisms with the STA 103A. Similarly, the AP 101 can communicate 109B through wireless or wired coupling mechanisms with the STA 103B. In the same vein, the AP 101 can communicate 109C through wireless or wired coupling mechanisms with the STA 103C.

The system 100 may be designed in accordance with the IEEE 802.11ax protocol. In such a system, the AP 101 can utilize orthogonal frequency-division multiple access (OFDMA), which makes it possible to simultaneously transmit, in parallel, frames to multiple STAs (e.g., STAs 103A-103C, etc.). One feature of OFDMA includes subdividing a channel into smaller frequency allocations, called resource units (RUs). To serve the multiple STAs 103A-103C, the AP 101 assigns at least one RU to each of the STAs 103A-103C. After the assignment of RUs, uplink (UL) and downlink (DL) communications can occur between the AP 101 and the multiple STAs 103A-103C simultaneously on the RUs.

Multi-user multiple input multiple output (MU-MIMO) is another feature of a system 100 that is designed in accordance with the IEEE 802.11ax protocol. Like OFDMA, MU-MIMO also allows for simultaneous UL and DL communications between the AP 101 and the STAs 103A-103C. MU-MIMO includes using beamforming to direct signals to one or more intended wireless devices (e.g., the AP 101, one or more of the STAs 103A-103C, etc.).

To coordinate UL OFDMA transmissions or UL MU-MIMO transmissions, the AP 101 can transmit a trigger frame to the STAs 103A-103C. A trigger frame is a control frame that administers access to a WM and provides MAC layer reliability functions. More specifically, a trigger frame specifies common parameters of an upcoming UL OFDMA transmission or an upcoming UL MU-MIMO transmission (e.g., duration, guard intervals (GIs), etc.), allocates RUs for the STAs 103A-103C, and defines one or more transmission parameters for at least one of the STAs 103A-103C. These transmission parameters include a packet length, a transmit power, a modulation and coding scheme (MCS), a number of spatial streams (NSS), a channel width, a modulation scheme, an encoding scheme, a physical layer convergence protocol data unit (PPDU) format, a bandwidth (BW), a PPDU duration, etc.

After receiving the trigger frame, the STAs 103A-103C respond in a synchronized fashion. More specifically, the STAs 103A-103C generate a trigger-based (TB) packet. The TB packet can be a TB PPDU or any other TB packet used to respond to a trigger frame. The STAs 103A-103C further transmit, to the AP 101, the TB packet after a specified time interval called a short interframe space (SIFS). After the AP 101 receives the TB packet, the AP 101 generates one or more block acknowledgement (BA) frames (e.g., a BA frame for each STA 103A-103C, a multi-STA BA frame for two or more of the STAs 103A-103C, etc.). The AP 101 then transmits, to the STAs 103A-103C, the BA frame(s) after the SIFS. Subsequently, UL OFDMA transmissions or UL MU-MIMO transmissions can begin.

A trigger frame may specify a packet length for the TB packets (e.g., TB PPDUs, etc.) generated by the STAs 103A-103C. Usually, the packet length is the same for all the TB packets that are to be generated by the STAs 103A-103C. In many scenarios, the STAs 103A-103C include differing amounts of data in each of their respective TB packets. For example, the amount of data that the STA 103A includes in its TB packet is smaller than or larger than the amount of data that the STA 103B includes in its TB packet. However, due to the fact that each of the TB packets associated with the STAs 103A-103C is to have the same length, some of the TB packets may need to be padded to fulfill the length requirement. This phenomenon is sometimes referred to as packet length equalization.

Padding includes filling up unused portions of a data structure (e.g., a packet, a frame, etc.) with bits, characters, and/or dummy frames. Padding may be performed at the end of the data structure to fill it up with data. Data structures may be padded with "1" bits, blank characters, null characters, or dummy frames. With specific regard to the example system 100, transmitting padded TB packets from the STAs 103A-103C to the AP 101 can, in some situations, be suboptimal. For example, the amount of current or power associated with transmitting a padded TB packet from the STA 103A to the AP 101 may be suboptimal. In particular, and for this example, the amount of current or power associated with transmitting the padding in the padded TB packet may be undesirably larger than the amount of current or power associated with transmitting the data portion of the padded TB packet. In such a scenario, current or power is wasted on transmitting unimportant data (e.g., padding, etc.).

Examples described herein can assist with reducing the amount of current or power associated with transmitting a TB packet generated by an STA. In one example, an STA (e.g., any one of STAs 103A-103C, etc.) has data that will not fill up a TB packet (e.g., a TB PPDU, etc.) whose length is specified in a trigger frame received by the STA. In this example, the STA generates a TB packet with a length that is less than the length specified by the trigger frame. More specifically, the STA generates a TB packet with little or no padding. The example TB packet will sometimes be referred to herein as a shortened TB packet.

Given that there is little to no padding in a shortened TB packet, mostly or only relevant or required data is included in the shortened TB packet. Minimizing or eliminating the padding in a TB packet results in reducing the amount of current or power associated with transmitting the TB packet. That is, transmitting a shortened TB packet (which has a length that is less than a length specified by a trigger frame) avoids one or more of the shortcomings described above. For one example, the amount of current or power associated with transmitting the data portion of a shortened TB packet will be higher than the current or power associated with transmitting the padding of the shortened TB packet (if the shortened TB packet includes padding). For another example, and with regard to a shortened TB packet that lacks padding, there will be no current or power dedicated to transmitting padding. In both of the preceding examples, most or all of the current or power associated with transmitting the shortened TB packet is dedicated to transmitting the data portion of the shortened TB packet. In this way, little or no current or power is dedicated to transferring padding. Given that current or power is saved by using the shortened TB packet (instead of a "full length" TB packet), the transmitting STA's operation or the functioning of the system 100 as a whole may be improved.

Figure 2A:
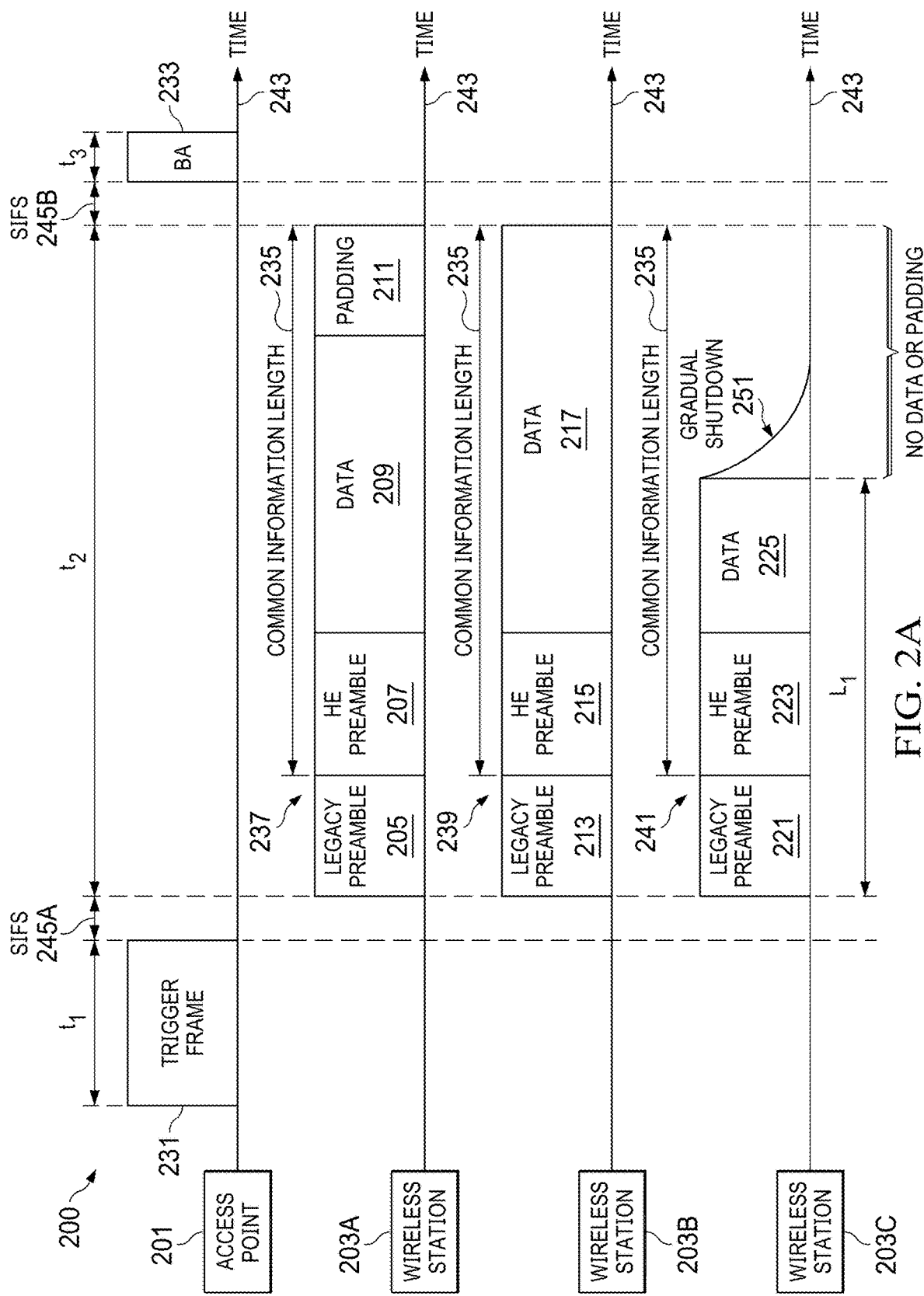
FIGS. 2A-2B are illustrations of timing diagrams showing interactions between an example access point (AP) and example wireless stations (STAs) in a system of a network designed in accordance with the Institute of Electrical and Electronics Engineers (IEEE) 802.11ax protocol.
Figure 2B:
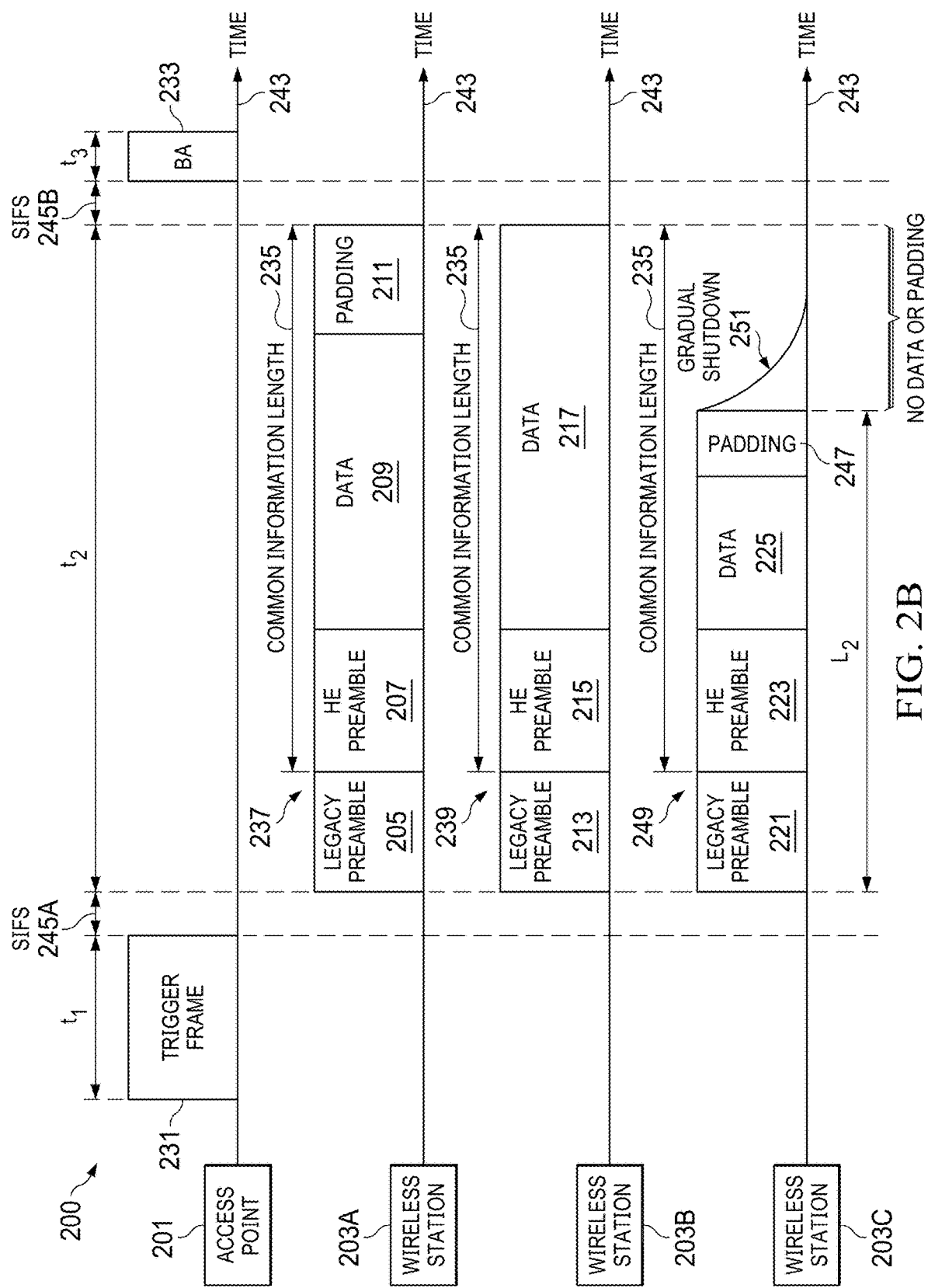

FIGS. 2A-2B are illustrations of timing diagrams showing interactions between an example access point (AP) 201 and example wireless stations (STAs) 203A-203C in a system 200 of a network designed in accordance with the IEEE 802.11ax protocol. The system 200 is similar to or the same as the system 100 described above in connection with FIG. 1. As shown in FIGS. 2A-2B, the system 200 includes an AP 201 and STAs 203A-203C. The AP 201 is similar to the AP 101 described above in connection with FIG. 1.

In each of FIGS. 2A-2B, data exchanges between the AP 201 and the STAs 203A-203C are with regard to time, which is represented by the horizontal axis 243. Time, as depicted by the horizontal axis 243, increases in the right direction. Thus, frames and packets are exchanged at specific times (e.g, $t_1$, $t_2$, $t_3$, short interframe space (SIFS) 245, etc.).

With regard now to FIG. 2A, the AP 201 generates a trigger frame 231. Trigger frames are described above in connection with FIG. 1. Next, at time $t_1$, the AP 201 transmits the trigger frame 231 to the STAs 203A-203C during a time frame $t_1$.

Following receipt of the trigger frame 231, each of the STAs 203A-203C processes the trigger frame 231 and generates a TB packet. More specifically, the STA 203A processes the trigger frame 231 and generates a TB packet 237, the STA 203B processes the trigger frame 231 and generates a TB packet 239, and the STA 203A processes the trigger frame 231 and generates a TB packet 241. Each of the TB packets 237, 239, and 241 can be a TB PPDU or any other TB packet used for responding to a trigger frame (e.g., trigger frame 231, etc.).

After a SIFS 245A has elapsed, each of the STAs 203A-203C transmits its respective one of the TB packets 237, 239, and 241 to the AP 201 during a time frame $t_2$. The AP 201 generates a BA 233 in response to receiving the TB packets 237, 239, and 241. After a SIFS 245B has elapsed, the AP 201 transmits the BA 233 to the STAs 203A-203C during a time frame $t_3$. After the STAs 203A-203C receive the BA 233, UL OFDMA transmissions or UL MU-MIMO transmissions can begin. In one example, the SIFS 245A-245B have the same duration, which is predetermined.

Each of the TB packets 237, 239, and 241 can be a TB PPDU. In some scenarios, a TB PPDU includes a legacy preamble, a high efficiency (HE) preamble, and a payload, which is sometimes referred to herein as data. In other scenarios, the TB PPDU further includes padding. As shown in FIG. 2A, the TB PPDU 237 includes a legacy preamble 205, an HE preamble 207, data 209, and padding 211. Furthermore, and as shown in FIG. 2A, the TB PPDU 239 includes a legacy preamble 213, an HE preamble 215, data 217, and no padding. Additionally, and as shown in FIG. 2A, the TB PPDU 241 includes a legacy preamble 221, an HE preamble 223, data 225, and no padding/data.

A legacy preamble (e.g., any one of the legacy preambles 205, 213, and 221, etc.) enables a TB PPDU to be decoded by legacy devices (e.g., devices that are not designed to work with the IEEE 802.11ax protocol, etc.). In other words, the legacy preamble is included in the TB PPDU for backward compatibility. The legacy preamble includes: (i) a legacy short training field (L-STF), which is sometimes referred to as a non-high throughput (HT) short training field; (ii) a legacy training field (L-LTF), which is sometimes referred to as a non-HT training field; and (iii) a legacy signal field (L-SIG), which is sometimes referred to as a non-HT signal field.

An HE preamble (e.g., HE preamble 207, HE preamble 215, HE preamble 223, etc.) can only be decoded by devices that are designed to work with the IEEE 802.11ax protocol. An HE preamble includes: (i) a repeated legacy signal field (RL-SIG), which is sometimes referred to as a repeated non-HT signal field; (ii) an HE signal A field (HE-SIG-A); (iii) an HE signal B field (HE-SIG-B); (iv) an HE short training field (HT-STF); and (v) an HE long training field (HE-LTF).

A TB PPDU also includes a payload (e.g., data 209, data 217, data 225, etc.). Such data may include a service field, a physical layer service data unit (PSDU), and PPDU tail bits. A part of the bits of the service field may be used for synchronization at a receiver. The PSDU corresponds to a MAC protocol data unit (PDU) defined at the MAC layer and may include data generated/used in a higher layer. The PPDU tail bits may be used to return an encoder to a zero state.

Usually, the legacy preambles (e.g., legacy preamble 205, legacy preamble 213, legacy preamble 221, etc.) have a predetermined size, and as a result, will require a predetermined amount of time (e.g., length of time, etc.) to be transmitted to the AP 201. Additionally, the HE preambles (e.g., HE preamble 207, HE preamble 215, HE preamble 223, etc.) have a predetermined size, and as a result, will require a predetermined amount of time (e.g., length of time, etc.) to be transmitted to the AP 201. The payloads (e.g., data 209, data 217, data 225, etc.), however, may have differing sizes from each other, and as a result, will require differing amounts of time (e.g., lengths of time, etc.) to be transmitted to the AP 201. For example, and as shown in FIG. 2A, the data 225 is smaller than the data 209, which is smaller than the data 217. Consequently, and for this example, the lengths of time associated with transmitting the data 209, data 217, and data 225 will vary. In spite of these differences, each of the TB PPDUs 237, 239, and 241 has a common information length 235 that is specified by the trigger frame 231. That is, each of the STAs 203A-C is required to communicate its respective one of the TB PPDUs 237, 239, and 241 within a specific time frame ($t_2$) that is based on the common information length 235 set forth in the trigger frame 231. In such a scenario, one or more of the STAs 203A-203C may employ padding to ensure that its TB PPDU conforms to the length specified by the trigger frame 231. For example, and with regard to FIG. 2A, the STA 203A generates a TB PPDU 237 that includes a legacy preamble 205, an HE preamble 207, data 209, and padding 211. In this example, the data 209 lacks a length that satisfies the common information length 235. Thus, the STA 203A pads the TB PPDU 237 to ensure that the TB PPDU 237 conforms to the length specified by the trigger frame 231.

It is not always the case that an STA (e.g., any one of STAs 203A-203C, etc.) employs padding. For example, and with regard to FIG. 2A, the STA 203B generates a TB PPDU 239 that includes a legacy preamble 213, an HE preamble 215, and data 217. In this example, the data 217 has a length that satisfies the common information length 235. Thus, the STA 203B does not pad the TB PPDU 239.

With specific regard to the system 200 set forth in FIG. 2A, transmitting the padded TB PPDU 235 from the STA 103A to the AP 201 can, in some situations, be suboptimal. For example, the amount of current or power associated with transmitting the padded TB PPDU 235 from the STA 103A to the AP 201 may be suboptimal. In particular, and for this example, the amount of current or power associated with transmitting the padding 211 in the padded TB PPDU 235 may be higher than the amount of current or power associated with transmitting the data 209 in the padded TB PPDU 235. In such a scenario, current or power is wasted on transmitting unimportant data (e.g., padding 211, etc.).

Examples described herein can assist with reducing the amount of current or power associated with transmitting a TB packet generated by an STA. In one example, and with regard to FIG. 2A, the STA 203C has data 225 that will not fill up the TB PPDU 241, whose length is specified in the trigger frame 231 received by the STA 203C. In this example, the STA 203C generates a TB PPDU 241 with a length $L_1$ that is less than the common information length 235 specified by the trigger frame 231. In particular, the STA 203C generates a TB PPDU 241 with no padding. This example TB PPDU 241 will sometimes be referred to herein as a shortened TB PPDU 241.

Given that there is no padding in the shortened TB PPDU 241, only relevant or required data 225 is included in the shortened TB PPDU 241. Eliminating the padding in the TB PPDU 241 results in reducing the amount of current or power associated with transmitting the TB PPDU 241. That is, transmitting a shortened TB PPDU 241 (which has a length $L_1$ that is less than a length 235 specified by the trigger frame 231) avoids one or more of the shortcomings described above. For example, and with regard to the shortened TB PPDU 241, there will be no current or power dedicated to transmitting padding. Thus, most or all of the current or power associated with transmitting the shortened TB PPDU 241 is directed to transmitting the data 225. Given that current or power is saved by using the shortened TB PPDU (instead of a "full length" TB PPDU, such as the TB PPDU 237), the transmitting STA 203C's operation or the functioning of the system 200 as a whole may be improved.

Referring now to FIG. 2B, another example of the system 200 is shown. The system 200 set forth in FIG. 2B is similar to the system 200 set forth in FIG. 2A, with the exception that the STA 203C in FIG. 2B generates and transmits a TB PPDU 249 to the AP 201. The example TB PPDU 249 includes a legacy preamble 221, an HE preamble 223, data 225, and padding 247. The TB PPDU 249 is one example of a TB packet that can assist with reducing the amount of current or power associated with transmitting the TB packet generated by an STA. In one example, and with regard to FIG. 2B, the STA 203C has data 225 that will not fill up the TB PPDU 247, whose length is specified in the trigger frame 231 received by the STA 203C. In this example, the STA 203C generates a TB PPDU 249 with a length $L_2$ that is less than the common information length 235 specified by the trigger frame 231. In particular, the STA 203C generates a TB PPDU 249 with padding 247 that does not fill up the entire length, as specified by the trigger frame 231, of the TB PPDU 249. This example TB PPDU 249 will sometimes be referred to herein as a shortened TB PPDU 249.

Given that there is only a small amount of padding 247 in the shortened TB PPDU 249, only relevant or required data 225 and a small amount of unimportant data (e.g., padding 247, etc.) is included in the shortened TB PPDU 249. Minimizing the padding in the TB PPDU 249 results in reducing the amount of current or power associated with transmitting the TB PPDU 249. That is, transmitting a shortened TB PPDU 249 (which has a length $L_2$ that is less than a length 235 specified by the trigger frame 231) avoids one or more of the shortcomings described above. For example, and with regard to the shortened TB PPDU 249, the current or power dedicated to transmitting padding 247 will be less than the current or power dedicated to transmitting the data 225. Thus, a larger proportion of the current or power associated with transmitting the shortened TB PPDU 249 is dedicated to transmitting the data 225 and a smaller proportion of the current or power associated with transmitting the shortened TB PPDU 249 is dedicated to transmitting unimportant data (e.g., padding 247, etc.). Given that current or power is saved by using the shortened TB PPDU 249 (instead of a "full length" TB PPDU, such as the TB PPDU 237), the STA 203C's operation or the functioning of the system 200 as a whole may be improved.

In FIGS. 2A-2B, the STA 203C completes transmission of the shortened TB PPDU (e.g., TB PPDU 241, TB PPDU 249, etc.) prior to the end of the time frame $t_2$. In some scenarios, after the STA 203C completes the transmission of the shortened TB PPDU (e.g., TB PPDU 241, TB PPDU 249, etc.), the STA 203C shuts down. Consequently, the STA 203C will shut down before any one of the STAs 203A-203B shuts down. In many scenarios, the STA 203C may shut down abruptly. The STA 203C's early and abrupt shutdown may affect the operation of the STAs 203A-203B. Specifically, the STA 203C's early and abrupt shutdown may result in transient events that negatively impact the operation of the STAs 203A-203B. To avoid the creation of transient events, the STA 203C may, in one example, be designed to gradually shut down 251 after transmitting the shortened TB PPDU (e.g., TB PPDU 241, TB PPDU 249, etc.) to the AP 201. In one example, and as shown in each of FIGS. 2A-2B, the STA 203C gradually shuts down 251 radio frequency (RF) power associated with transmitting the shortened TB PPDU (e.g., TB PPDU 241, TB PPDU 249, etc.) following transmission of the data 225 in the shortened TB PPDU. FIG. 3, which is described below, provides additional details about gradually shutting down an STA that transmits a shortened TB PPDU to an AP.

FIG. 3 is an illustration of an example graph 300 highlighting a gradual drop in gain over time that is attributable to a gradual shutdown of an example wireless station (STA). The graph 300 includes a vertical axis 305 that represents the gain in current (or power) associated with the example STA and a horizontal axis 307 that represents the time associated with shutting down the example STA after it completes transmission of a TB packet (e.g., a TB PPDU, a shortened TB PPDU, etc.).

As explained above in FIGS. 1-2B, an STA (e.g., the STA 203C described above in connection with FIGS. 2A-2B, etc.) that transmits a shortened TB PPDU (e.g., TB PPDU 241, TB PPDU 249, etc.) to an AP (e.g., AP 201, etc.) will complete its transmission prior to a length of time specified by a trigger frame (e.g., trigger frame 231, etc.). Usually, the STA that transmits the shortened TB PPDU shuts down abruptly after transmitting the shortened TB PPDU. This abrupt shutdown creates sharp drop in gain, as shown by the curve 303 set forth in FIG. 3. Conceptually, the sharp drop in gain represented by the curve 303 may be likened to an ideal brick wall response 303. The sharp drop in gain may create transient events that affect the operation of other STAs that are associated with the STA that transmitted the shortened TB PPDU.

In one example, the STA that transmits the shortened TB PPDU is designed to gradually shutdown after transmitting the shortened TB PPDU to the AP. This gradual shutdown creates a gradual drop in gain, as represented by the curve 301 set forth in the graph 300. This gradual drop in gain minimizes or eliminates the occurrence of transient events that may affect the operation of other STAs that are associated with the STA that transmitted the shortened TB PPDU.

Figure 4:
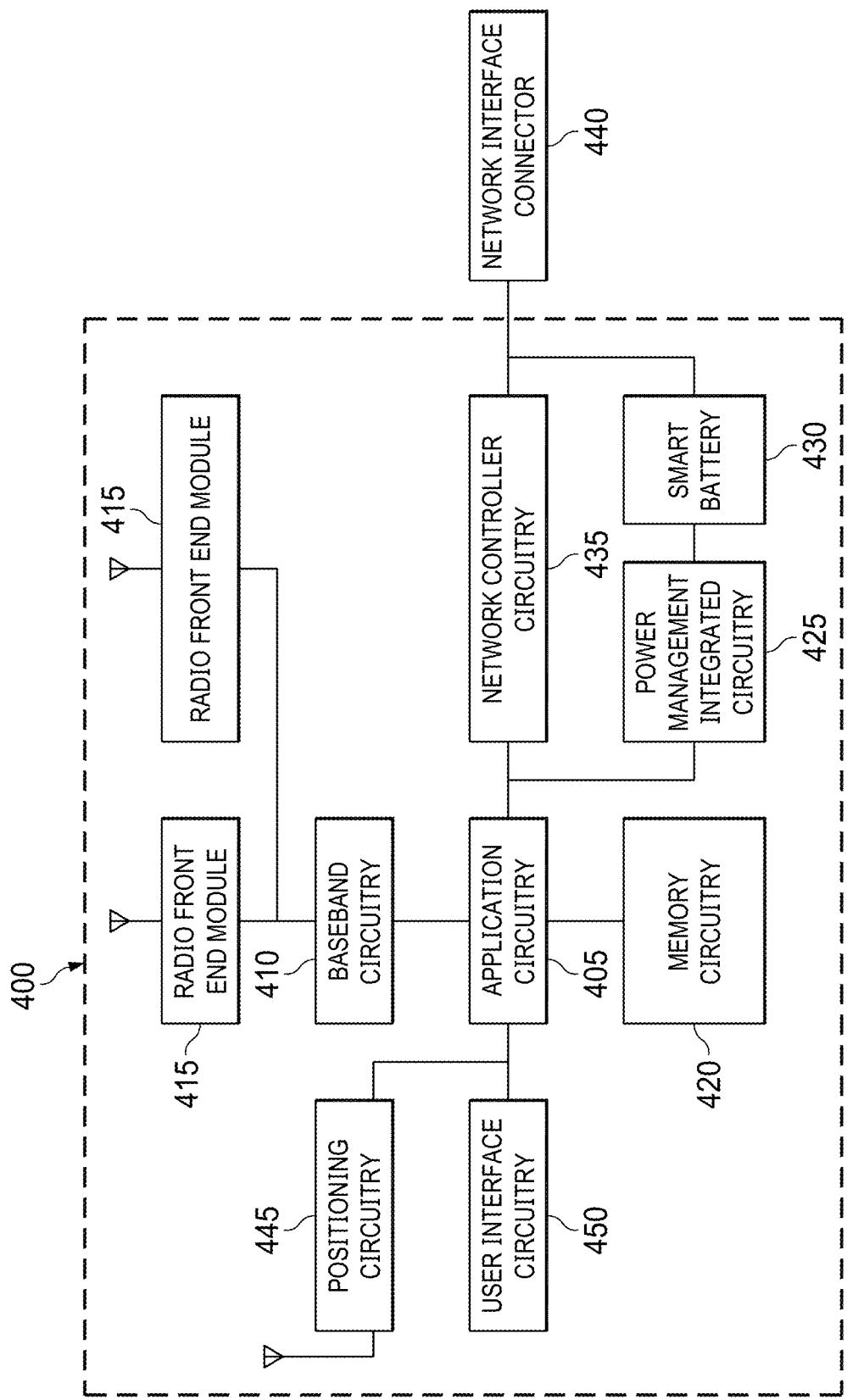
FIG. 4 is an illustration of an electronic device in accordance with some examples.

FIG. 4 is an illustration of an electronic device 400 in accordance with some examples. The electronic device 400 may implement any or all of a base station or an AP (e.g., AP 101, AP 201, etc.) or an STA (e.g., any one of STAs 103A-103C, any one of STAs 203A-203C, etc.) and/or any other element/device discussed herein. The electronic device 400 may include one or more of application circuitry 405, baseband circuitry 410, one or more radio front end modules 415, memory circuitry 420, power management integrated circuitry (PMIC) 425, power circuitry 430, network controller circuitry 435, network interface connector 440, satellite positioning circuitry 445, and user interface 450. In some examples, the electronic device 400 may include additional elements such as, for example, memory/storage, display, camera, sensor, or input/output (I/O) interface. In other examples, the components described below may be included in more than one device. That is, the electronic device 400 may be spread across multiple devices.

As used herein, the term "circuitry" may refer to, is part of, or includes hardware components such as an electronic circuit, a logic circuit, a processor (shared, dedicated, or group) and/or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some examples, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these examples, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, AP (e.g., AP 101, AP 201, etc.), gateway, server, virtualized virtual network function (VNF), network functions virtualization infrastructure (NFVI), and/or the like.

Application circuitry 405 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or JO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. In some examples, the electronic device 400 may not utilize application circuitry 405, and instead may include a special-purpose processor/controller to process internet protocol (IP) data received from a network (e.g., a network designed in accordance with the 802.11ax protocol, a network designed in accordance with any of the other 802.11 protocols, etc.).

Additionally or alternatively, application circuitry 405 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such examples, the circuitry of application circuitry 405 may comprise logic blocks or logic fabric, and other interconnected resources that may be programmed to perform various functions, such as the procedures, methods, functions, etc. of the various examples discussed herein (e.g., generation of a shortened TB PPDU as described above in connection with FIGS. 1-3, etc.). In such examples, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits (ICs), a single packaged IC soldered to a main circuit board or a multi-chip module containing two or more ICs. Although not shown, baseband circuitry 410 may comprise one or more digital baseband systems, which may be coupled via an interconnect subsystem to a central processing unit (CPU) subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In some examples, the baseband circuitry 410 may include protocol processing circuitry with one or more instances of control circuitry (not shown) to provide control functions for the digital baseband circuitry and/or radio frequency circuitry (e.g., the radio front end modules 415).

User interface circuitry 450 may include one or more user interfaces designed to enable user interaction with the electronic device 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas. In one example, one or more of the RFEMs 415 transmits a shortened TB PPDU generated by the application circuitry 405 to an AP (e.g., AP 101, AP 201, etc.). Generating and transmitting a shortened TB PPDU is described above in connection with FIGS. 1-3.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power circuitry 430 may provide for electrical power drawn from a network cable to provide both power supply and data connectivity to the electronic device 400 using a single cable.

The network controller circuitry 435 may provide connectivity to a network (e.g., a network designed in accordance with the 802.11ax protocol, a network designed in accordance with any one of the 802.11 protocols, etc.) using a standard network interface protocol such as Ethernet, Ethernet over GRE Tunnels, Ethernet over Multiprotocol Label Switching (MPLS), or some other suitable protocol. Network connectivity may be provided to/from the electronic device 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 545 may comprise various hardware elements (e.g., including hardware devices such as switches, filters, amplifiers, antenna elements, and the like to facilitate over-the-air (OTA) communications) to communicate with components of a positioning network, such as navigation satellite constellation nodes.

Nodes or satellites of the navigation satellite constellation(s) (GNSS nodes) may provide positioning services by continuously transmitting or broadcasting GNSS signals along a line of sight, which may be used by GNSS receivers (e.g., positioning circuitry 445 and/or positioning circuitry implemented by STAs (e.g., any one of STAs 103A-103C, any one of STAs 203A-203C, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some examples, the positioning circuitry 445 may include a Micro-Technology for Positioning, Navigation, and Timing (Micro-PNT) integrated circuit (IC) that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 445 may provide data to application circuitry 405 that may include one or more of position data or time data. Application circuitry 405 may use the time data to synchronize operations with other radio base stations (e.g., AP 101, AP 201, etc.).

The components shown in FIG. 4 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 5:
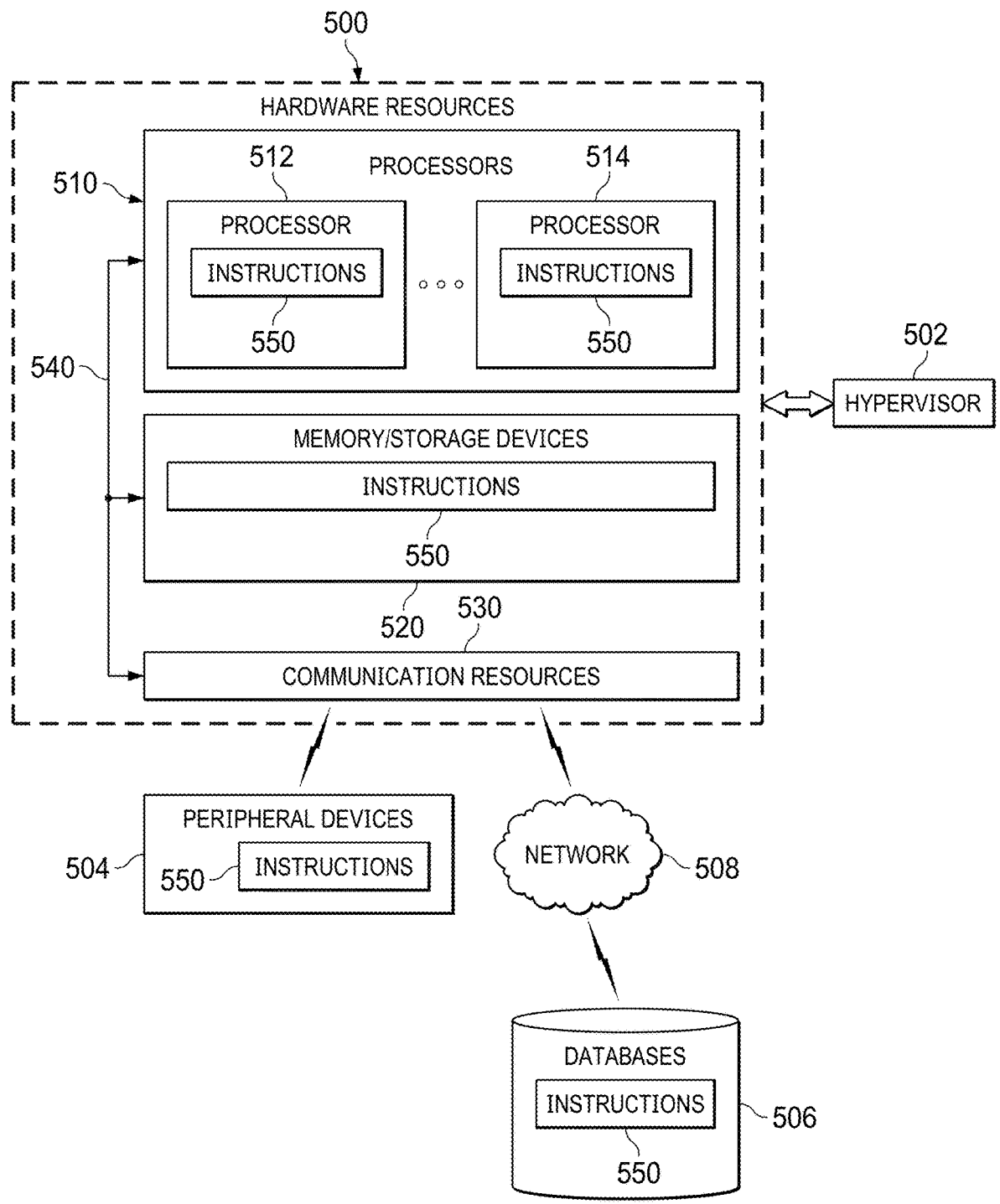
FIG. 5 is an illustration of components of an electronic device in accordance with some examples.

FIG. 5 is a block diagram illustrating components, according to some examples, able to read instructions from a machine-readable or computer-readable medium (e.g., a non-transitory machine-readable storage medium) and perform any one or more of the methodologies or techniques discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For examples where node virtualization (e.g., NFV, etc.) is utilized, a hypervisor 502 may be executed to provide an execution environment for one or more network slices/sub-slices to utilize the hardware resources 500. A "virtualized resource" may refer to compute, storage, and/or network resources provided by virtualization infrastructure to an application, device, system, etc.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 550 may comprise software, a program, an application, an applet, an app, or other executable code for causing at least any of the processors 510 to perform any one or more of the methodologies or techniques discussed herein. For example, the instructions 550 may comprise executable code that enables generation and transmission of a shortened TB PPDU, as described above in connection with FIGS. 1-3. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

At least one of the components set forth in one or more of the preceding figures may be configured to perform one or more operations, techniques, processes, and/or methods as set forth in the examples discussed herein. For example, the baseband circuitry as described above in connection with one or more of the preceding figures may be configured to operate in accordance with one or more of the examples discussed herein. For another example, circuitry associated with an STA, an AP, network element, etc. as described above in connection with one or more of the preceding figures may be configured to operate in accordance with one or more of the examples discussed herein.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors. Furthermore, the use of "A or B," "A and/or B," "A and B," "at least one of A or B," "at least one of A and B," "A/B," or "one or more of A and B" is intended to mean A alone, B alone, or A and B together.

Modifications are possible in the described examples, and other examples are possible, within the scope of the claims.

What is claimed is:

1. A method, comprising:
receiving, by a wireless station (STA), a trigger frame specifying a first length of a trigger-based (TB) packet;
generating, by the STA, a first TB packet that includes a preamble, data, and padding, wherein a second length of the first TB packet is less than the first length;
transmitting, by the STA, the first TB packet during an uplink transmission; and
shutting down the STA in response to completing transmission of the first TB packet and before an end of the uplink transmission.

2. The method of claim 1, wherein shutting down the STA comprises reducing a gain of the STA at a slower rate than a rate of a brick wall response.

3. The method of claim 1, wherein shutting down the STA comprises reducing a gain of the STA during a period of a plurality of µs.

4. The method of claim 1, wherein shutting down the STA comprises reducing a gain of the STA at a rate selected to avoid transient events in other wireless stations that receive the trigger frame.

5. The method of claim 1, wherein shutting down the STA comprises gradually dropping a gain of the STA over time.

6. The method of claim 1, wherein shutting down the STA comprises gradually shutting down radio frequency (RF) power associated with transmitting the first TB packet.

7. The method of claim 1, further comprising receiving, by the STA, a block acknowledgement in response to completing transmission of the first TB packet.

8. The method of claim 1, wherein the preamble comprises a legacy preamble and a high efficiency (HE) preamble.

9. The method of claim 1, wherein the trigger frame is a trigger frame in accordance with an IEEE 802.11 protocol standard.

10. The method of claim 1, wherein receiving the trigger frame comprises receiving the trigger frame from an access point (AP) that complies with an IEEE 802.11ax protocol standard.

11. The method of claim 1, wherein the STA is a mobile device and includes an IEEE 802.11-conformant physical layer (PHY) interface.

12. The method of claim 1, wherein the trigger frame specifies a transmit power, a modulation and coding scheme (MCS), a number of spatial streams (NSS), a channel width, a modulation scheme, an encoding scheme, a physical layer convergence protocol data unit (PPDU) format, a bandwidth (BW), and a PPDU duration.

13. A wireless device comprising:
a radio front end module; and
a processor configured to:
receive, via the radio front end module, a trigger frame specifying a first length of a trigger-based (TB) packet;
generate a first TB packet that includes a preamble, data, and padding, wherein a second length of the first TB packet is less than the first length;
transmit the first TB packet during an uplink transmission; and
shut down the wireless device in response to completing transmission of the first TB packet and before an end of the uplink transmission.

14. The wireless device of claim 13, wherein shutting down the wireless device comprises reducing a gain of the wireless device at a slower rate than a rate of a brick wall response.

15. The wireless device of claim 13, wherein shutting down the wireless device comprises reducing a gain of the wireless device during a period of a plurality of µs.

16. The wireless device of claim 13, wherein shutting down the wireless device comprises reducing a gain of the wireless device at a rate selected to avoid transient events in another wireless device.

17. The wireless device of claim 13, wherein shutting down the wireless device comprises gradually dropping a gain of the wireless device over time.

18. The wireless device of claim 13, wherein shutting down the wireless device comprises gradually shutting down the radio front end module.

19. The wireless device of claim 13, wherein the processor is configured to receive a block acknowledgement in response to completing transmission of the first TB packet.

20. The wireless device of claim 13, wherein the preamble comprises a legacy preamble and a high efficiency (HE) preamble.

21. The wireless device of claim 13, wherein the trigger frame is a trigger frame in accordance with an IEEE 802.11 protocol standard.

22. The wireless device of claim 13, wherein receiving the trigger frame comprises receiving the trigger frame from an access point (AP) that complies with an IEEE 802.11ax protocol standard.

23. The wireless device of claim 13, wherein the wireless device is a mobile device and includes an IEEE 802.11-conformant physical layer (PHY) interface.

24. The wireless device of claim 13, wherein the trigger frame specifies a transmit power, a modulation and coding scheme (MCS), a number of spatial streams (NSS), a channel width, a modulation scheme, an encoding scheme, a physical layer convergence protocol data unit (PPDU) format, a bandwidth (BW), and a PPDU duration.

25. The wireless device of claim 13, wherein the wireless device further comprises an antenna coupled to the radio front end module.

* * * * *